(12) United States Patent
Abu-Amara

(10) Patent No.: US 7,805,763 B2
(45) Date of Patent: Sep. 28, 2010

(54) METHOD FOR DISTRIBUTING VALUES FOR NETWORKS WITH MOBILE NODES

(75) Inventor: Hosame H. Abu-Amara, Round Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1399 days.

(21) Appl. No.: 11/239,261

(22) Filed: Sep. 29, 2005

(65) Prior Publication Data

US 2007/0070930 A1 Mar. 29, 2007

(51) Int. Cl.
*H04L 29/00* (2006.01)

(52) U.S. Cl. .................. 726/25; 370/216; 370/315; 370/406; 726/2; 726/22; 726/23; 726/24

(58) Field of Classification Search .......... 370/216, 370/315, 406; 726/2, 22–25
See application file for complete search history.

(56) References Cited

U.S. PATENT DOCUMENTS

| | | | | |
|---|---|---|---|---|
| 5,907,685 | A * | 5/1999 | Douceur | 709/248 |
| 2001/0039630 | A1 * | 11/2001 | Kursawe et al. | 714/4 |
| 2003/0083045 | A1 | 5/2003 | Blight | |
| 2005/0180356 | A1 * | 8/2005 | Gillies et al. | 370/329 |

FOREIGN PATENT DOCUMENTS

WO WO 03/009513 A2 1/2003
WO 2004105424 A2 12/2004

OTHER PUBLICATIONS

Cynthia Dwork, Nancy Lynch, Larry Stockmeyer; "Consensus in the Presence of Partial Synchrony"; Journal of the Association for Computing Machinery, vol. 35, No. 2, Apr. 1988, pp. 288-323.
Danny Dolev; "The Byzantine Generals Strike Again"; Journal of Algorithms 3, 1982, pp. 14-30.
Brian A. Coan, Danny Dolev, Cynthia Dwork, Larry Stockmeyer; "The Distributed Firing Squad Problem"; SIAM J. Comput., vol. 18, No. 5, Oct. 1989, pp. 990-1012.
Andre Postma, Thijs Krol; "Interactive Consistency in Quasi-Asynchronous Systems"; 1996 IEEE, pp. 2-9.
Tushar Deepak Chandra, Vassos Hadzilacos, Sam Toueg; "The Weakest Failure Detector for Solving Consensus"; Journal of the ACM, vol. 43, No. 4, Jul. 1996, pp. 685-722.

* cited by examiner

*Primary Examiner*—Kieu Oanh Bui
*Assistant Examiner*—Anthony Brown
(74) *Attorney, Agent, or Firm*—Philip A. Premysler; Sylvia Chen

(57) ABSTRACT

A method (100, 200, 300, 400, 600) for sharing values among nodes (processors) (900, 1004, 1006, 1008, 1010) in a network (1000) that includes mobile nodes that is resistant to corruption by faulty nodes. Movement of nodes triggers special messages forwarding processor values to and from nodes that have moved. Movement also triggers initialization of a round counter associated with each message forwarding the processor values in each node that handles the special messages that are triggered in response to movement. The round counter provides additional time for values to be distributed to nodes in the network.

13 Claims, 8 Drawing Sheets

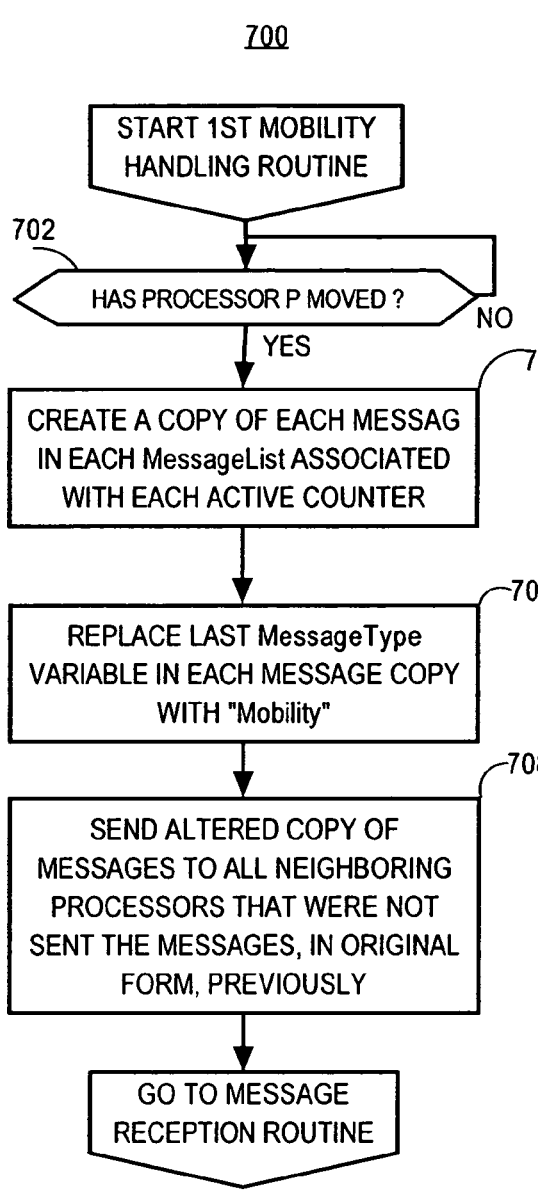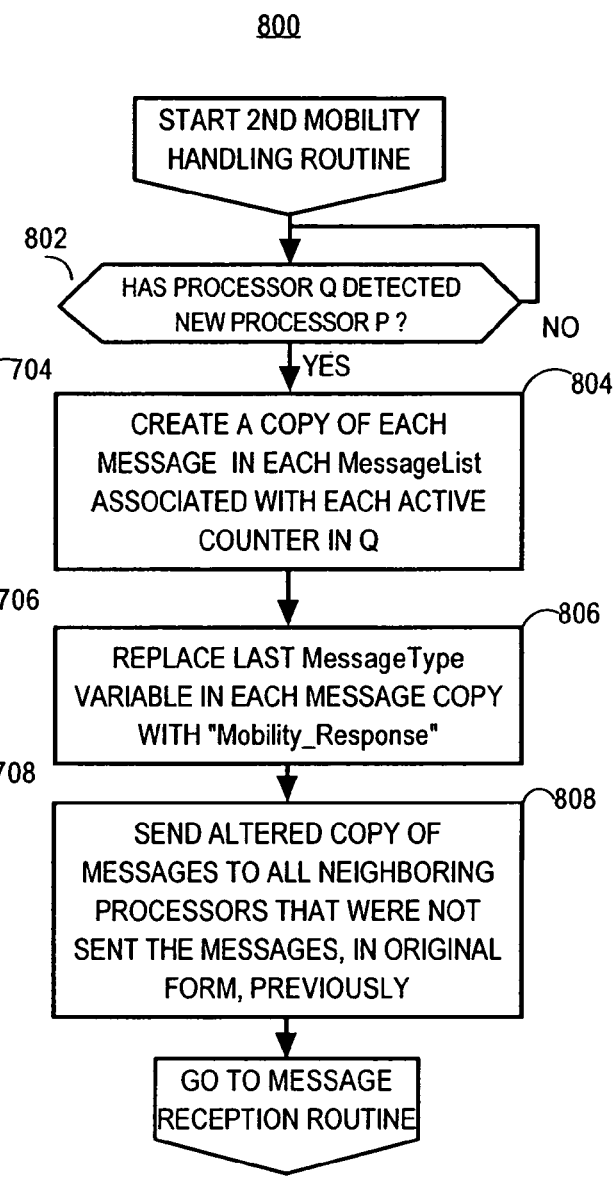

METHOD FOR DISTRIBUTING VALUES FOR NETWORKS WITH MOBILE NODES

FIELD OF THE INVENTION

The present invention relates generally to computer and telecommunication network security.

BACKGROUND

Since the early stages of the development of digital communication networks, the need for protocols that are fault tolerant and resistant to attack has been recognized. Fault tolerance implies, inter alia, the ability of certain network nodes to continue to use digital communication networks even if certain other nodes or links become disabled. Fault tolerance is provided by various networking protocols that will re-route messages around disabled nodes and links.

However, even nodes that are reachable and communicating may be compromised by a sophisticated cyber-attack. An attacker can also insert an unauthorized node into a digital communication network. In either case the node controlled by the attacker can undermine communications on the digital communication network.

One class of applications of digital communication networks essentially shares a set of values among a group of nodes in a network such that each node will obtain values from each other node. An object is for each node to acquire the same accurate set of values from other nodes in the group. Some nodes may be Byzantine faulty, i.e. one or more nodes may behave in an unpredictable, malicious manner, so that the nodes may announce conflicting, falsified values or may alter the contents of messages that pass through them. There are no restrictions on the type of behavior that these Byzantine faulty nodes may exhibit. Algorithms for solving this type of problem are called Byzantine Algorithms. Note that it is impossible to directly test a node for Byzantine faults because Byzantine nodes can respond to tests as normal nodes but then revert to Byzantine behavior after the test is over. Examples of applications of Byzantine Algorithms include Intrusion Detection and Countermeasure Systems, where Byzantine Agreement is used to identify and isolate nodes that have been compromised by hacker or rogue attacks, Sensor Networks, where Byzantine Agreement is used to agree on a common set of measured values even when some processors have been compromised, and Home Networks, where Byzantine Agreement is used to agree on a unique home networking key even when some devices have been compromised.

In recent years, there has been increased focus on wireless networks such as ad-hoc networks. Ad-hoc networks can be used for a variety of applications including sensor networks, and home networks. Ad-hoc networks are set up by autonomous network nodes that detect each other and establish communication links and message routing. Ad-hoc wireless networks may use a peer-to-peer communication protocol, in which case messages are routed through a sequence of intermediate nodes in order to minimize transmit power requirements. Networks that use peer-to-peer rounting are known as mesh networks. Mesh networks are typically not hierarchical, although certain for applications a particular node may perform a unique (e.g., supervisory) function with the network. Ad-hoc wireless networks are vulnerable to cyber-attack because it not necessary to physically connect to a transmission line in order to join an ad-hoc network. By their nature, ad-hoc wireless networks are intended to allow nodes to become part of the network. Once a malicious node has successfully joined a wireless ad-hoc network, messages will be routed through it and it will be able to transmit messages freely to other nodes. Thus, the malicious node may be able to compromise operation of the network.

In ad-hoc wireless networks, one or more network nodes may be mobile. Mobility poses a particular problem for Byzantine Algorithms that rely on network nodes being static.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 7 is a flowchart of a first mobility handling subroutine according to an embodiment of the invention;

FIG. 8 is a flowchart of a second mobility handling subroutine according to an embodiment of the invention;

Figure 1:
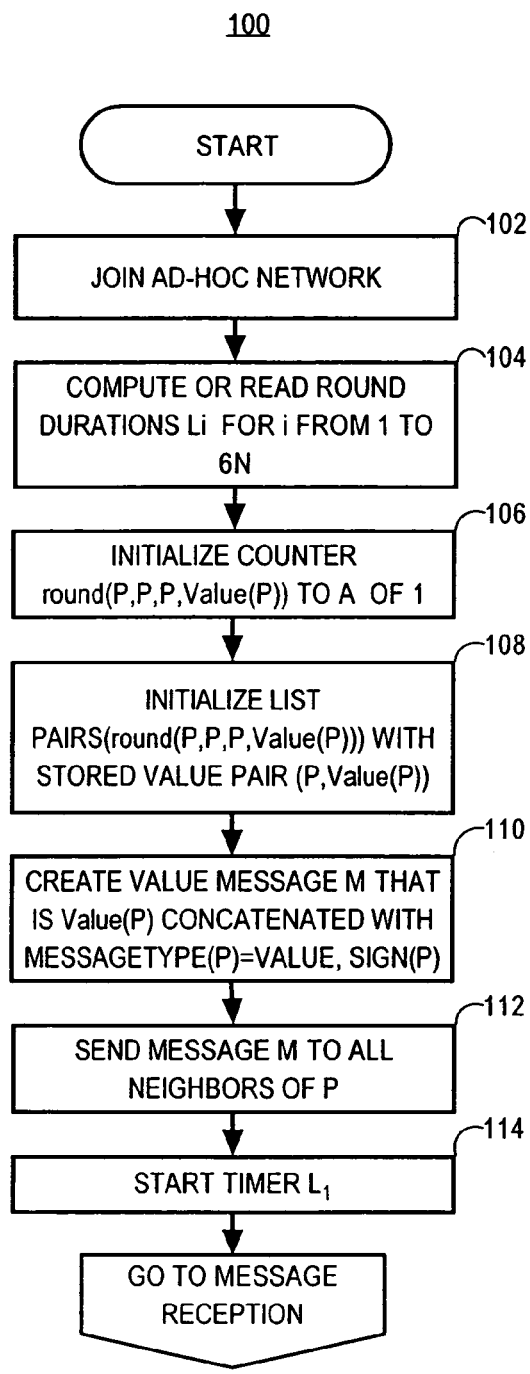
FIG. 1 is a flowchart of an initialization subroutine according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to security in networks that may have Byzantine faults. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of assuring security in networks with mobile devices and Byzantine faults described herein. The non-processor circuits may include, but are not limited to, a radio receiver, a radio transmitter, signal drivers, clock circuits, power source circuits, and user input devices. As such, these functions may be interpreted as steps of a method to achieve network security. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a flowchart of an initialization subroutine 100 according to an embodiment of the invention. In block 102 a network node (a "Pth" node) that is executing the subroutine 100 (also referred to, in the context of Byzantine Algorithms, as a 'processor') joins an ad-hoc network. The ad-hoc network is either known (e.g., through communication) to include a number n nodes, or is assumed to have at most n nodes. The number n is subsequently used as described below. One node will start the first and other nodes may start in response to receiving messages or may start on their own. In general, it is not assumed that the network nodes executing the described herein, begin execution of the method at the same time. Additionally, it is not assumed that the clocks in the nodes that are relied on in executing the method are synchronized or that the clocks run at exactly the same rate. According to certain embodiments the clocks in the n nodes may run fast or slow with respect to an accurate real-time clock but are assumed to be "ρ-bounded". By definition, if a clock is ρ-bounded the following inequalities hold:

$$\frac{1}{1+\rho} \le \frac{\text{clock}(P, t_2) - \text{clock}(P, t_1)}{t_2 - t_1} \le 1+\rho$$

where, $t_k$ is a $k^{th}$ real time measured on an accurate real-time clock;
clock$(P, t_k)$ is the value of a ρ-bounded clock in the Pth node at real time $t_k$;
ρ is a predetermined constant that is chosen based on the accuracy of the clocks in the ad-hoc network.

The method described hereinbelow uses rounds. A round is a sequence of steps that a node executes. At the start of a round, the node sends some messages. The node then waits to receive messages sent by other nodes and performs some local computations upon receiving the messages. Rounds have finite, known durations in time. At the end of a round, the node starts another round. The rounds have integer numbers starting at round number one.

In block 104 the network node that has joined the ad-hoc network computes or reads from memory a set of durations of rounds for a sequence of rounds that are enumerated by integers 1 to 6n. The durations are given by the following expressions.

$L_1 = \tau_{max} \cdot (1+\rho)$ $L_i = L_{i-1} \cdot (1+\rho)^2$ for $2 \le i \le 4n$ $L_{4n+1} = \zeta \cdot (1+\rho) \cdot L_{4n}$, where $n < \zeta \cdot (1+\rho)^{2n}$ $L_i = L_{i-1} \cdot (1+\rho)^2$ for $4n+2 < i < 6n$ where, $L_i$ is the duration of round i as measured on the node's local clock;
$\tau_{max}$ is a known upper bound on the time required to communicate a message from one node to another;
$\zeta$ is a positive number chosen such that $\zeta$ is at least 1 and satisfies the relation $n < \zeta \cdot (1+\rho)^{2n}$ The method described herein also uses round counters. A round counter keeps track of the number of rounds that have elapsed from the specific points in the execution of the method. In block 106, the Pth node initializes a round counter labeled round(P,P,P,VALUE(P)) with a value of one. In the round counter label the first three parameters are nodes (in this case all set to P) and the last parameter is a node value of a node indicated by an argument (in this case P). The node value VALUE(P) is the value that node P is programmed to communicate to other nodes. Each round counted by the round counter round(P,P,P,VALUE(P)) has a duration given by the foregoing set of expressions. The round counter round (P,P,P,VALUE(P)) and all other round counters of the form round(X,Y,Z,VALUE(w)) count to a maximum round number of 3n. A worst case scenario in terms of message latency for a message sent from the Pth node to other nodes in the ad-hoc network occurs if the nodes in the network are arranged in a linear topology. In this worst case, allowing for possible slowness of other nodes' ρ-bounded clocks relative to the clock of the Pth node, 2n rounds having durations given above provides sufficient time for the message from the Pth node to travel from one end of the linear topology network to the other, and a message including a processor value from the node at the far end of the linear topology network to be received by the Pth node.

In block 108 a list of pairs denoted PAIRS(round(P,P,P, VALUE(P))) that is associated with the counter round(P,P,P, VALUE(P)) is initialized. Each pair in the list of pairs includes an identification of a node, i.e. a node name, and a node value for the identified node. Initially the list of pairs will include a pair for the Pth node itself. Eventually the list of pairs will include pairs received from other nodes while the counter round(P,P,P,VALUE(P)) is active.

In block 110 a value message is created. The value message includes the binary value of the Pth node concatenated with a variable MessageType, and a cryptographic signature of the Pth node. We assume that each node, say P, has a unique cryptographic digital signature, denoted sign(P), that cannot be forged in the case of faultless nodes. Each node has a valid set of signatures of all other nodes in the network. No assumption is made about the signatures of Byzantine faulty nodes. In particular, we allow a faulty node's signature to be forged by another faulty node, thereby permitting collusion among the faulty nodes. The MessageType variable is set to "Value" in block 110. Other values of the MessageType variable that are used elsewhere in the method in handling situations in which a node moves are "Mobility" and "MobilityResponse". "Value" is the MessageType in the simpler case of static processors. Although, meaningful names are used here in the interest of clarity, in practice the MessageType variable can be communicated in binary form.

In block 112 the value message created in block 110 is sent to all nodes within communication range of the Pth node. Nodes within communication range of the Pth node are termed neighbors of P.

In block 114 a timer that times the duration $L_1$, of the first round of the round counter round(P,P,P,VALUE(P)) is started.

Figure 2:
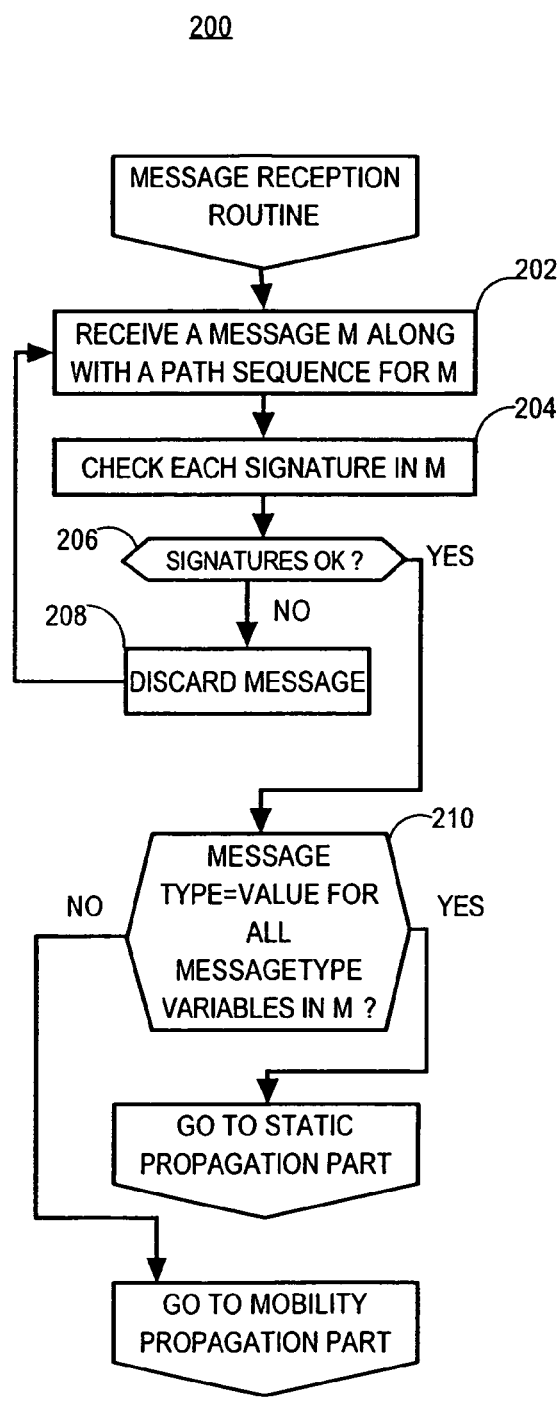
FIG. 2 is a flowchart of a message reception subroutine according to an embodiment of the invention.

FIG. 2 is a flowchart of a message reception subroutine 200 according to an embodiment of the invention. After executing block 114 the method proceeds to the message reception subroutine 200. In order to execute the message reception routine the Pth processor operates a transceiver to listen for messages sent by other nodes. In block 202 the Pth node receives a message M (an mth message). The message M includes a processor identification and node value pair denoted ($P_o$, value(m)) for a $P_o^{th}$ node that originated the message, a signature of the $P_o^{th}$ node, a signature of each node that the message M has been relayed through, and a MessageType variable for the $P_o^{th}$ node and for each node that the message has been relayed through. Once validated, the signatures yield information as to a path (denoted Path(M)) through which the message M has traveled.

In block 204 each signature in the Path(M) is checked. The outcome of decision block 206 depends on whether all of the signatures were valid. If not, then in block 208 the message M is discarded and the message reception routine returns to block 202 to receive new messages.

If all of the signatures are good, then the subroutine 200 proceeds to decision block 210. The outcome of block 210 depends on whether all of the MessageType variables in the message M were equal to "Value". If so, then execution continues with a static propagation subroutine 300 shown in FIG. 3. Otherwise, execution proceeds with a mobility propagation subroutine 400 shown in FIGS. 4, 5.

Figure 3:
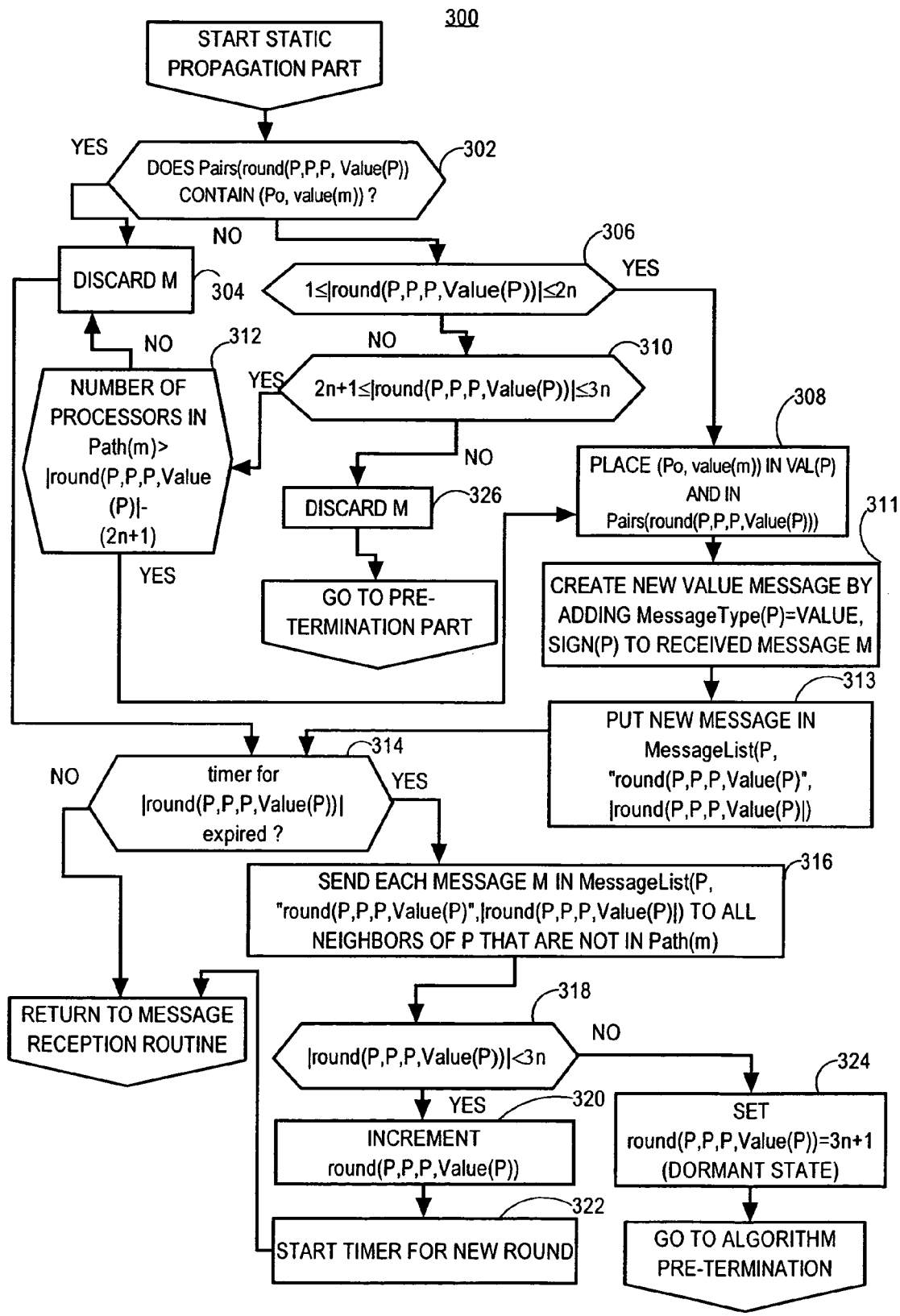
FIG. 3 is a flowchart of a static propagation subroutine according to an embodiment of the invention.

Referring to FIG. 3 a flowchart of the static propagation subroutine 300 will be described. Upon entering the static propagation subroutine 300 decision block 302 tests if the list of pairs denoted PAIRS(round(P,P,P,VALUE(P))) includes the processor value pair denoted ($P_o$, value(m)) received in message M. Note that in the case that all nodes in the network are faultless, value(m) is value($P_o$). However, the notation value(m) is used because of the possibility that different values for the processor $P_o$ are received due to the processor $P_o$ being faulty or due to a processor in the path(M) that through which the message M was delivered being faulty. If the value pair ($P_o$, value(m)) is found to be duplicative then in block 304 the message M is discarded.

If on the other hand the value pair ($P_o$,value(m)) is not in the list of pairs PAIRS(round(P,P,P,VALUE(P))) then the subroutine 300 proceeds to decision block 306. The outcome of decision block 306 depends on whether the round counter round(P,P,P,VALUE(P)) is between 1 and 2n. If yes, then in block 308 the value pair (Po, value(m)) is placed in PAIRS (round(P,P,P,VALUE(P))) and in a list of all pairs received by the Pth processor that is denoted VAL(P). VAL(P) will also include pairs from lists associated with other round counters i.e., round counters associated with mobility and mobility response type messages, which are explained below. It is an objective of the method described herein to ensure that all faultless nodes have the same pairs included in their VAL lists.

If it is determined in block 306 that the counter round(P,P, P,VALUE(P)) is not between 1 and 2n, then the subroutine 300 continues to decision block 310. The outcome of decision block 310 depends on whether the value of the round counter round(P,P,P,VALUE(P)) is between 2n+1 and 3n. If so then in block 312 a further test is performed. The outcome of block 312 depends on whether the number of processors (with valid signatures) in path(M) is greater than the value of the counter round(P,P,P,VALUE(P))−(2n+1). If all processors that handled the received message are faultless and the message has not been compromised or fabricated by a faulty processor, then by the time the counter round(P,P,P,VALUE(P)) reaches 2n+1 the received message should have propagated through enough processors to accumulate the necessary number of valid signatures to satisfy the inequality in block 312. If the outcome of block 312 is negative the subroutine 300 proceeds to block 304 in which the message M is discarded. If the outcome of block 312 is positive then the subroutine 300 proceeds to block 308 which is described above.

After block 308 the subroutine proceeds to block 311 in which a new message is created by concatenating "Value" for the MessageType variable, and the signature of the Pth processor to the received message M. Next in block 313 the new message is placed in an outgoing message list associated with the round counter round(P,P,P,VALUE(P)) that is denoted MessageList(P, "round(P,P,P,Value(P))",|round(P,P,P,Value (P))|), where "round(P,P,P,Value(P))" is a text string consisting of the name round(P,P,P,Value(P)), and |round(P,P,P,Value (P))| is the current value of the counter round(P,P,P,Value(P)). In practice the parameters identifying the message list can be represented in binary form.

From block 304 in which the message M is discarded and from block 313, the subroutine continues with block 314. In block 314 the timer for the current round of the round counter round(P,P,P,Value(P)) is checked to determine if it has expired. If the timer has not expired, then the method returns to the message reception subroutine 200 shown in FIG. 2. When the timer expires, in block 316 each particular message in MessageList(P, "round(P,P,P,Value(P))",|round(P,P,P, Value(P))|) is sent to neighbors of the Pth processor that are not in the path of the particular message. Messages need not be sent back to processors from which they were forwarded.

After block 316, decision block 318 depends on whether the current value of the round counter round(P,P,P,Value(P)) is less than 3n. If so, then in block 320 the round counter round(P,P,P,Value(P)) is incremented and in block 322 a timer is started for the new round. If the current round counter round(P,P,P,Value(P)) is equal to 3n then in block 324 the round counter round(P,P,P,Value(P)) is set to 3n+1 which signifies a dormant state. A dormant state means that the value of round(P,P,P,Value(P)) remains at 3n+1 and is not changed. After block 324 the subroutine 300 branches to a pre-termination subroutine 600 shown in FIG. 6 and described hereinbelow.

Also, if block 310 is reached and the outcome is negative meaning that round(P,P,P,Value(P)) is already equal to 3n+1 signifying a dormant state, then in block 326 the received message M is discarded and the method branches to the pre-termination subroutine 600.

Figure 4:
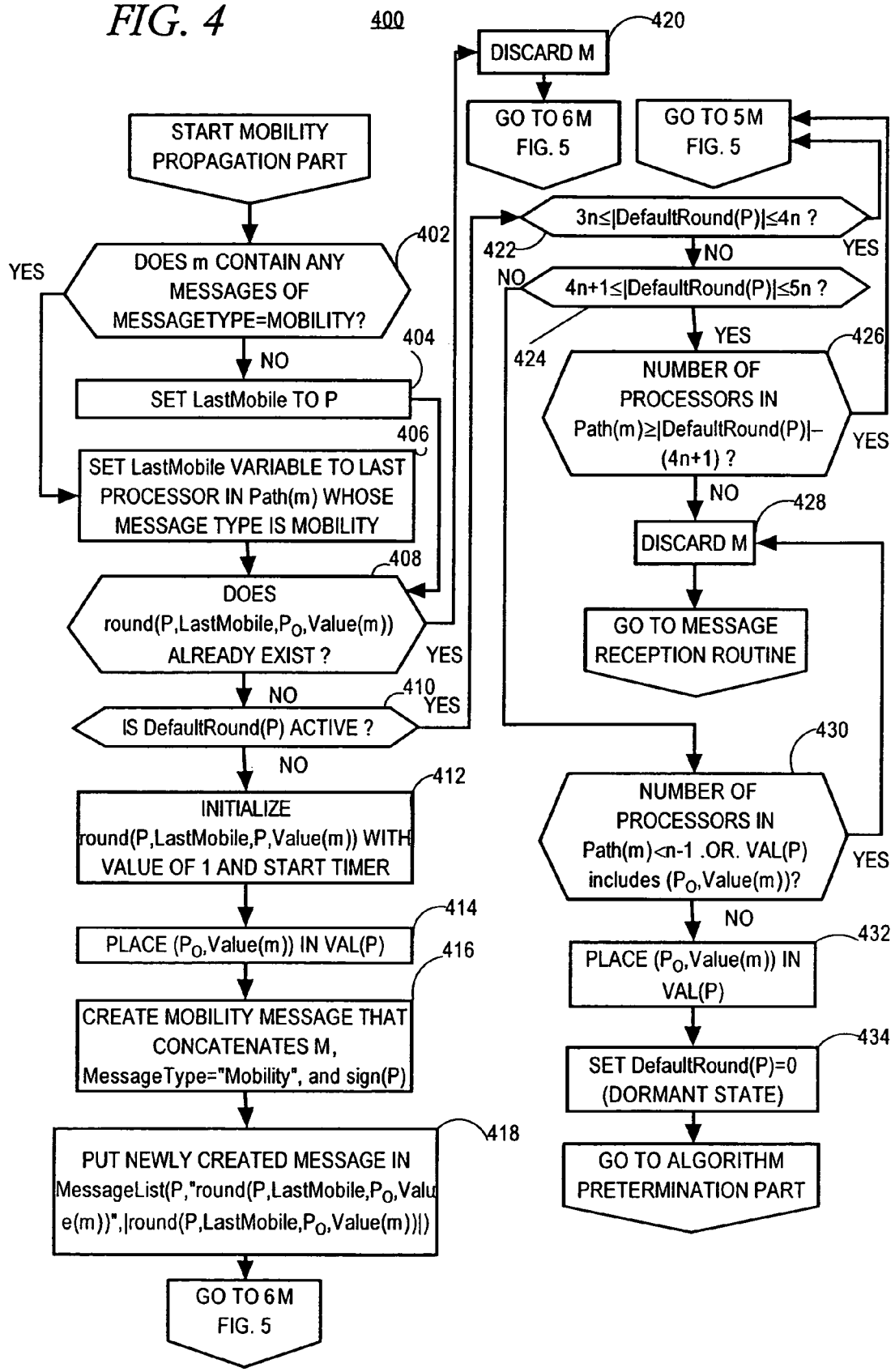
FIG. 4 is a first part of a mobility propagation subroutine according to an embodiment of the invention.
Figure 5:
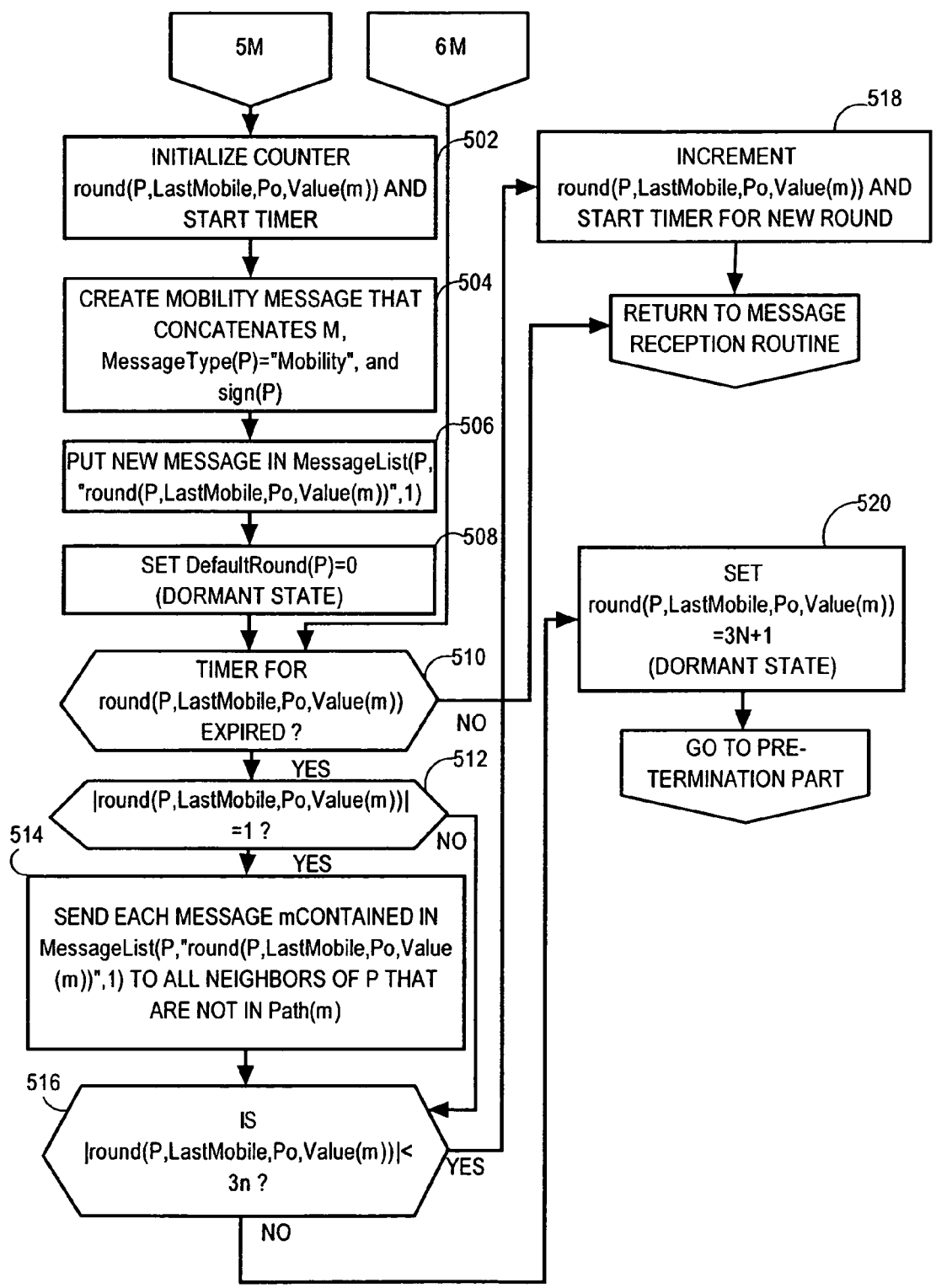
FIG. 5 is a second part of the mobility propagation subroutine according to an embodiment of the invention.

Referring to FIGS. 4-5 a mobility propagation subroutine 400 will now be described. The mobility propagation subroutine handles two types of messages that arise when processors move. A first type which has the MessageType variable equal to "Mobility" is generated by a processor that moves. The process of generating messages with the MessageType variable equal to "Mobility" is further described in FIG. 7. A second type which has the MessageType variable equal to "Mobility Response" is generated by new processors that detect another processor that has moved into range. The process of generating messages with the MessageType variable equal to "Mobility Response" is further described in FIG. 8. Whether a received message is a "Mobility" or a "Mobility Response" message changes the way in which a round counter that is created for the received message is named. Naming the round counter is handled in the first three blocks of the subroutine 400 and the remainder of the subroutine 400 is the same for both types of messages.

Referring to FIG. 4, decision block 402 depends on whether the received message M contains any MessageType variables equal to "Mobility". If not, then the mobility propagation routine 400 was entered because the message M included a MessageType variable equal to "Mobility Response". In the latter case the message M has been sent to the Pth processor in response to the Pth processor moving into range of the sending processor, and in block 404 a LastMobile variable is set to P. If it is determined in block 402 that the message does include a MessageType variable equal to "Mobility" then the subroutine 400 branches to block 406 in which the LastMobile variable is set to a last processor in the path of the message M that has a MessageType variable equal to "Mobility".

After blocks 404 and 406, execution continues with decision block 408 which depends on whether a counter round(P, LastMobile, $P_o$, value(m)) already exists. If not then execution continues with decision block 410 which depends on whether a termination counter for the Pth processor (denoted DefaultRound(P)) is active. The termination counter DefaultRound(P) allows a number of extra rounds (e.g., 3n rounds) for messages to be received before each processor terminates execution of the method. Further explanation of the DefaultRound counter appears when discussing the pre-termination part of the method in FIG. 6.

If DefaultRound(P) is not active then in block 412 the counter round(P, LastMobile, $P_o$, value(m)) is initialized with a value of 1 and a timer is started for round one of the counter round(P, LastMobile, $P_o$, value(m)). Next in block 414 the pair ($P_o$, value(m)) is placed in the list of pairs VAL(P). Next in block 416 a mobility message that concatenates the received message M with MessageType="Mobility" and the signature of the Pth node is created. In block 418 the mobility message created in block 416 is placed in a message list denoted MessageList(P,"round(P,LastMobile,$P_o$,value(m))", |round(P,LastMobile,$P_o$, value(m))|). From there the mobility propagation subroutine 400 proceeds to connector 6M in FIG. 5. Also if it is determined in block 408 that the round counter round(P, LastMobile, $P_o$, value(m)) already exists, then in block 420 the message M is discarded and the mobility propagation subroutine 400 proceeds to connector 6M in FIG. 5. FIG. 5 is described below.

If it is determined in block 410 that the termination counter is active, then the subroutine 400 proceeds to decision block 422. Decision block 422 tests if the termination counter is in the closed range of 3n to 4n. (Note that DefaultRound(P) ranges from 3n to 6n when active.) If the outcome of the block 422 is positive then the mobility propagation subroutine 400 continues to connector 5M in FIG. 5. Continuing to connector 5M ultimately leads to the received message being propagated on to other processors.

If all processors that handled the message M were faultless (meaning the message M is not corrupted), then if a message is received after n rounds of the termination counter DefaultRound(P) have elapsed, the message must have passed through a sufficient number of processors and accumulated a certain expected numbers of valid signatures. Tests to verify the integrity of the message based on these considerations are performed in subsequent blocks.

If the outcome of block 422 is negative then the subroutine 400 continues to decision block 424 the outcome of which depends on whether the termination counter is in the closed range of 4n+1 to 5n. If the outcome of block 424 is positive, then block 426 verifies that the number of processors in path(M) is greater or equal to the value of the termination counter minus (4n+1). If the outcome of block 426 is negative, then in block 428 the message M is discarded and the subroutine 400 returns to the message reception subroutine 200. If the outcome of block 426 is positive then the subroutine 400 branches to connector 5M in FIG. 5. If it is determined in block 424 that the termination counter is not in the closed range 4n+1 to 5n then the subroutine 400 branches to decision block 430. Note that if the outcome of block 424 is negative the termination counter, which was determined to be active in block 410 must be in the closed range from 5n+1 to the maximum active value of 6n.

The outcome of decision block 430 depends on whether the number of processors in the path of the message M is less than n-1 (i.e., does not include all other processors) or the list of processor pairs VAL(P) already includes the value pair ($P_o$, value(m)) from the received message M. If either condition is true then the subroutine 400 branches to block 428 in which the message M is discarded. If the outcome of block 430 is negative then in block 432 the value pair ($P_o$, value(m)) is placed in VAL(P), and in block 434 DefaultRound(P) is set to 0, which is a dormant state for DefaultRound(P), i.e. DefaultRound(P) is not incremented until P re-executes the pre-termination part described in FIG. 6. After block 434 the method proceeds to the pre-termination subroutine 600 shown in FIG. 6.

Referring to FIG. 5 the second part of the mobility handling subroutine is shown. In block 502, which follows the connector 5M, the counter round(P, LastMobile, $P_o$, value(m)) is initialized to value 1 and the timer is started for the first round of the counter. Next in block 504 a new message is created by concatenating the received message M, MessageType="Mobility" and the signature of the Pth processor. In block 506 the new message is put in a new message list MessageList(P, "round(P,LastMobile,$P_o$,value(m))",1) and in block 508 the termination counter is made dormant by setting it to zero.

After block 508, block 510 tests if the timer for the current round of the counter round(P, LastMobile, $P_o$, value(m)) has expired. Note that connector 6M leads directly to block 510. If the timer has not expired, the method returns to the message reception subroutine 200 in order to await additional messages. When the timer expires the subroutine 400 continues with decision block 512 which depends on whether the counter round(P, LastMobile, $P_o$, value(m)) is equal to one. If so, then in block 514 each particular message M in MessageList(P, "round(P,LastMobile,$P_o$,value(m))",1) is sent to all neighbors of the Pth processor that are not in the path path(M) of the particular message. After block 514, or immediately after decision block 512 in the case of a negative outcome of block 512, the subroutine 400 reaches decision block 516. The outcome of decision block 516 depends on whether the counter round(P,LastMobile,$P_o$,value(m)) is less than 3n (the maximum active value). If the counter is less than 3n, then in block 518 the counter is incremented and a timer started for the new round of the counter. If not, meaning that the counter round(P,LastMobile,$P_o$,value(m)) is equal to 3n, then in block 520 the round counter round(P,LastMobile,$P_o$,value(m)) is set to 3n+1, a dormant state, i.e. the value of round(P,Last- Mobile,$P_o$,value(m)) remains at 3n+1 and is not changed, and then the method proceeds to the pre-termination subroutine 600 shown in FIG. 6.

Figure 6:
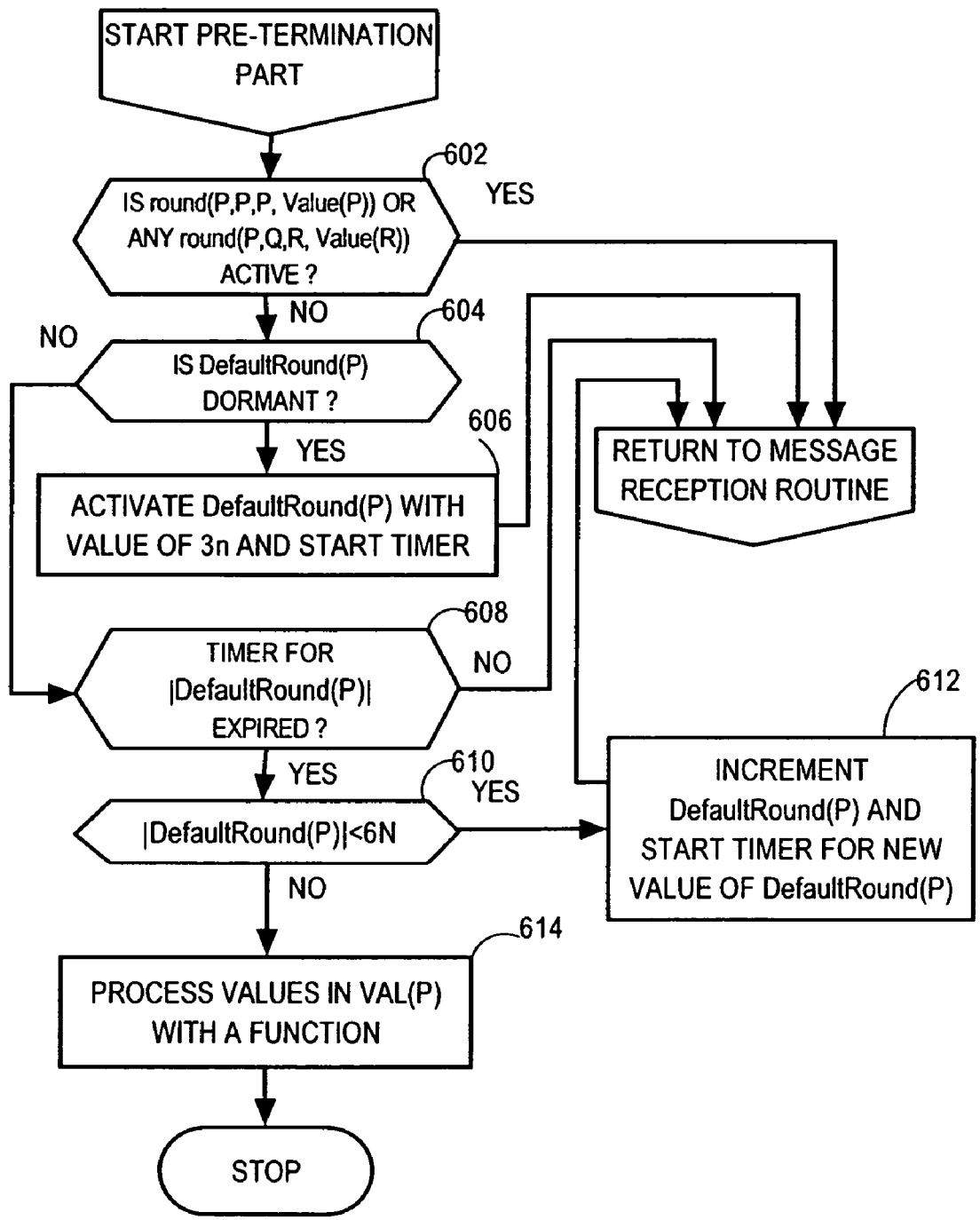
FIG. 6 is a flowchart of a pre-termination subroutine according to an embodiment of the invention.

FIG. 6 is a flowchart of the pre-termination subroutine 600 according to an embodiment of the invention. Upon entering the pre-termination subroutine 600 decision block 602 tests if the round counter round(P,P,P,VALUE(P)) initialized by the Pth processor in block 106 or any round counter round(P,Q, R,VALUE(R)) started by the mobility propagation subroutine 400 is still active. If so the method returns to the message reception subroutine 200. If the outcome of block 602 is negative, then subroutine 600 proceeds to decision block 604, which tests if DefaultRound(P) is dormant. If DefaultRound (P) is dormant, then in block 606 DefaultRound(P) is activated with the initial value of 3n and the timer is started for round 3n. After block 606 the method returns to the message reception subroutine 200. In the case that DefaultRound(P) is found to be active in block 604, the subroutine 600 proceeds to decision block 608 which tests if the timer for the current round of DefaultRound(P) has expired. If the timer has not expired, then the method returns to the message reception subroutine. If the timer has expired then block 610 tests if DefaultRound(P) is less than 6n. If DefaultRound(P) is less than 6n then in block 612 DefaultRound(P) is incremented and a timer is started for the new round of DefaultRound(P) and then the method returns to the message reception subroutine.

If it is determined in block 610 that DefaultRound is equal to 6n then in block 614 the values in VAL(P) are processed with a function. The function used to process the values in VAL(P) depends on the particular application that uses the method described herein. For example, for Intrusion Detection & Countermeasure Systems, the value that is communicated by each processor can be a vote on whether a particular user is trust-worthy. In this case, the function decides which value in VAL(P) has a majority in VAL(P). Determining which value is in the majority, is appropriate in an application in which all faultless processors are supposed to be conveying the same information. A separate majority can be determined for each processor. Using the majority function enables a processor to determine correct values of other processors notwithstanding the presence of a limited number of corrupt processor values that were created by one or more faulty processors. Alternatively, in sensor networks, it may be advantageous for each processor to compute the average of the values reported by other processors. Since an objective of the method is to ensure that all faultless processors have the same node values in the VAL list, then all processors compute the same average notwithstanding creation of corrupt processor values by one or more faulty processors.

FIG. 7 is a flowchart of a first mobility handling subroutine 700 according to an embodiment of the invention. Decision block 702 tests if the Pth processor has moved. When the Pth processor moves, in block 704 a copy of each message in each message list associated with each active counter is created. Next, in block 706 the last MessageType variable in each message copy created in block 704 is changed to "Mobility". Processor P can do this replacement because each message copy has the property that the last processor in the path of the message is P. So, P can change the last MessageType variable in the message to "Mobility". Next in block 708 the messages that were altered in block 706 are sent to all neighboring processors that were not sent the messages in original form previously. Thereafter, the method returns to the message reception subroutine 200.

FIG. 8 is a flowchart of a second mobility handling subroutine 800 according to an embodiment of the invention. The second mobility handling subroutine 800 is described from the point of view of a Qth processor that first detects the Pth processor within range of the Qth processor. Decision block 802 depends on whether the Qth processor has detected the Pth processor. When the Qth processor detects the Pth processor, in block 804 the Qth processors creates a copy of each message in each message list associated with each active counter in the Qth processor. Next in block 806 the Qth processor makes the last MessageType variable in each message copy created in block 804 equal to "Mobility_Response". Next in block 808 the messages that were altered in block 806 are sent to all neighboring processors that were not sent the messages in original form previously. Thereafter, the method returns to the message reception subroutine 200.

Figure 9:
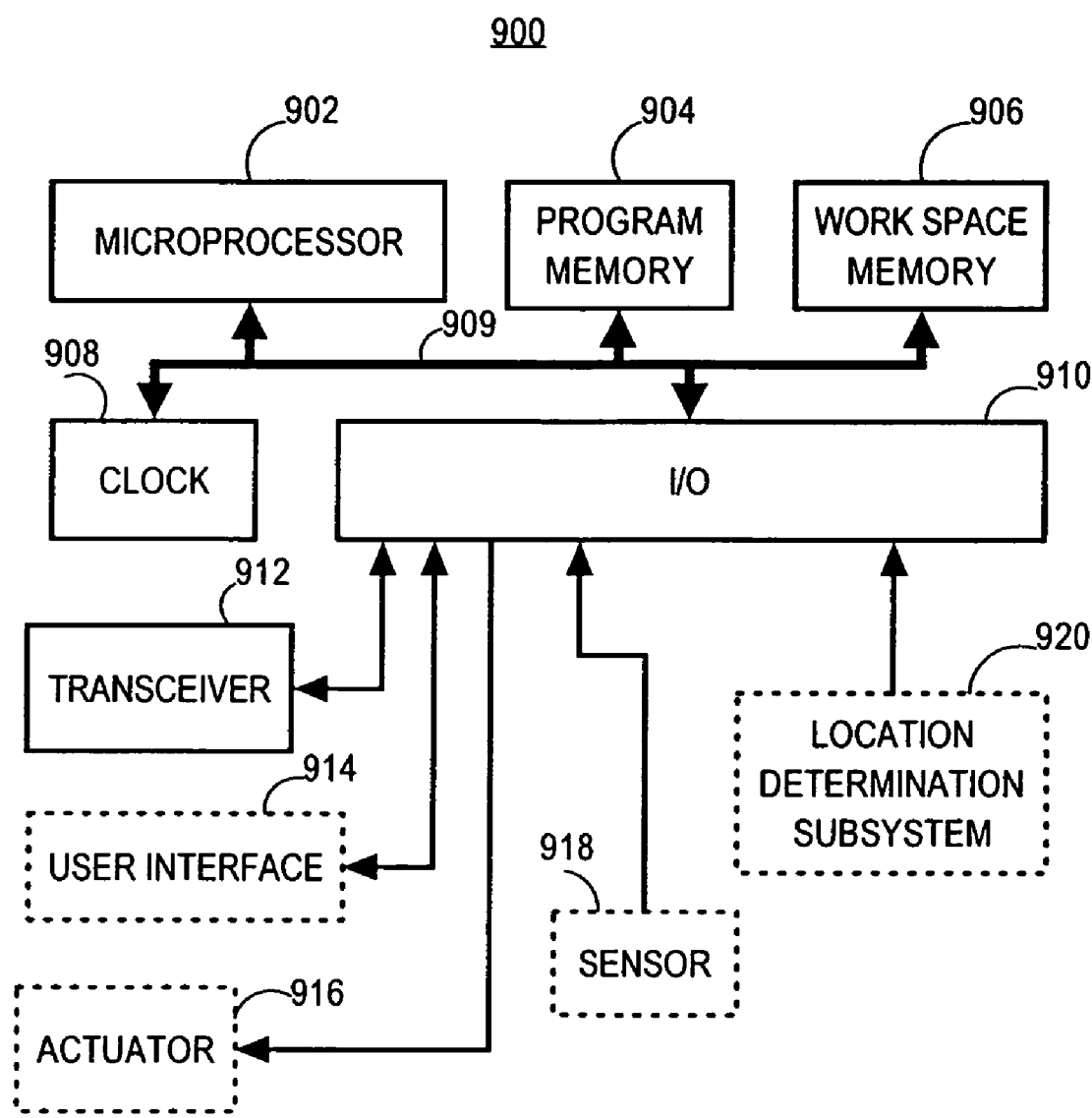
FIG. 9 is a block diagram of a network node according to an embodiment of the invention.

FIG. 9 is a block diagram of a first network node (processor) 900 according to an embodiment of the invention. The network node includes a microprocessor 902, a program memory 904, a work space memory 906, a clock 908, and an input/output interface 910 coupled together through a signal bus 909. Programs including the subroutines 100, 200, 300, 400, 600, 700, 800 are stored in the program memory 904 and executed by the microprocessor 902. The processor value of the first network node 900 itself can be stored in the program memory 904. Message lists associated with particular round counters and the list VAL(P) of all processor value pairs possessed by the network node 900 can be stored in the work space memory 906. The program memory 904 and the 906 can be implemented in the same memory device.

A transceiver 912, an optional user interface 914, an optional actuator 916, an optional sensor 918, and an optional location determination subsystem 920 are coupled to the input/output interface 910. For some applications, the processor value can be derived from sensor data collected by the sensor 918. According to some embodiments the location of the network node 900 is determined using the location determination subsystem 920. Alternatively, signals received via the transceiver 912 are processed to determine location. According to certain embodiments change in location is inferred from a change in a set of neighbors of a node.

Figure 10:
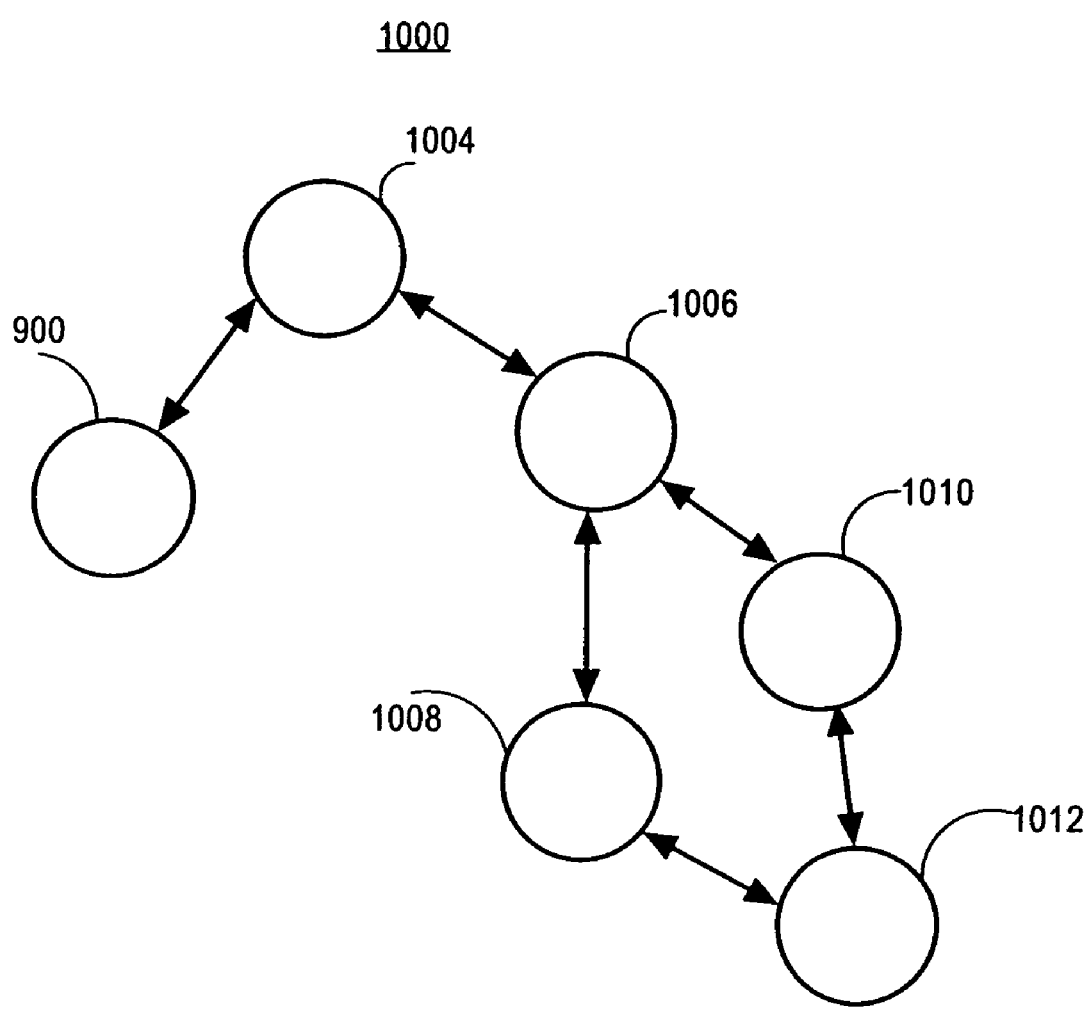
FIG. 10 shows an ad-hoc network according to an embodiment of the invention.

FIG. 10 shows an ad-hoc mesh network 1000 according to an embodiment of the invention. The network 1000 has a plurality of network nodes (processors) including the network node 900 shown in FIG. 9 and a plurality of additional network nodes 1004-1012. One or more of the additional nodes 1004-1012 can have the same internal design as the first network node 900 or a different design. In FIG. 10 double-headed arrows signify wireless connections.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method of operating processors in a network in order to distribute processors values of each processor to other processors, by a set of n processors, in the network, the method comprising:
    establishing a mesh network including the set of n processors, wherein each $P^{th}$ processor of the set of n processors is within communication range of at least a subset of the set of n processors;
    in each $P^{th}$ processor:
    obtaining a set of interval lengths comprising one interval length for each of a sequence of rounds;
    initializing a first round counter at a first round;
    initializing a first list of processor values;
    creating a message $M_p$ that includes a $P^{th}$ value of the $P^{th}$ processor;
    sending the message $M_p$ to the subset of n processors;
    starting a timer for the first round;
    operating a receiver to receive messages from other processors in the network;
    receiving one or more messages;
    for each $m^{th}$ message that was sent by a $P_o^{th}$ processor of the set of n processors and received by the $P^{th}$ processor from a $Q^{th}$ processor of the set of n processors and includes a $P_o^{th}$ processor value for the $P_o^{th}$ processor:
    if the $m^{th}$ message has come to the $P^{th}$ processor through a routing path in which each processor that handled the $m^{th}$ message was static when the $m^{th}$ message was handled, then:
        checking if the first list of processor values includes the $P_o^{th}$ processor value; and
        if the first list of processor values does not include the $P_o^{th}$ processor value:
            checking the first round counter; and:
                if the first round counter is below a first upper limit:
                    adding the $P_o^{th}$ processor value to the first list of processor values;
                    creating a new message that includes the $P_o^{th}$ processor value;
                    checking a timer for a current round of the first round counter; and
                    if the timer for the current round has expired, then:
                        sending the new message that includes $P_o^{th}$ processor value to at least a subset of the subset of processors within communication range of the $P^{th}$ processor;
    if the $m^{th}$ message has come to the $P^{th}$ processor through a routing path that includes at least one processor that moved prior to sending the $m^{th}$ message, then:
    checking if the $m^{th}$ message is redundant due to reception of a previously received message;
    if the $m^{th}$ message is not redundant:
    checking if a $P^{th}$ termination counter for the $P^{th}$ processor is active; and
    if the $P^{th}$ termination counter is not active:
    initializing a second round counter that is associated with the $m^{th}$ message;
    initializing a timer for a first round of the second round counter;
    storing the $P_o^{th}$ processor value in the $P^{th}$ processor;
    when the timer for the first round of the second round counter expires, sending the $P_o^{th}$ processor value to at least a subset of the subset of processors within communication range of the $P^{th}$ processor.

2. The method according to claim 1 further comprising:
    if the $P^{th}$ termination counter is active;
    if a first Boolean expression that requires that:
        the termination counter is less than a second upper limit OR
        the termination counter is less than a third upper limit that is greater than the first upper limit AND a number of processors in the routing path of the $m^{th}$ message is less than the value of the termination counter minus a predetermined number is true then:
    initializing the second round counter;
    initializing the timer for the first round of the second round counter;
    deactivating the termination counter;
    storing the $P_o^{th}$ processor value in the $P^{th}$ processor;
    when the timer for the first round of the second round counter expires, sending the $P_o^{th}$ processor value to at least a subset of the subset of processors within communication range of the $P^{th}$ processor.

3. The method according to claim 2 wherein:
    if the first Boolean expression is false but a second Boolean expression requires that:
        the number of processors in the routing path of the $m^{th}$ message is not less than n-1 AND the first list of processor values does not include the $P_o^{th}$ processor value is true:
    deactivating the termination counter; and
    storing the $P_o^{th}$ processor value in the $P^{th}$ processor.

4. The method according to claim 2 wherein:
    the second upper limit is 4n+1;
    the third upper limit is 5n+1; and
    the predetermined number is 4n+1.

5. The method according to claim 1 wherein sending the new message that includes $P_o^{th}$ processor value to at least the subset of the subset of processors within communication range of the $P^{th}$ processor comprises:
    sending the new message that includes the $P_o^{th}$ processor value to all processors within communication range of the $P^{th}$ processor except for the processors in the routing path.

6. The method according to claim 1 wherein creating a new message that includes the $P_o^{th}$ processor value comprises:
    creating a new message that includes the $P_o^{th}$ processor value and a signature of the $P^{th}$ processor.

7. The method according to claim 6 wherein creating a new message that includes the $P_o^{th}$ processor value and a signature of the $P^{th}$ processor comprises:
    creating a new message that includes the $P_o^{th}$ processor value, the signature of the $P^{th}$ processor and message type information that depends on whether the $P^{th}$ processor and processors in communication range of the $P^{th}$ processor that have not yet received the new message have moved prior to the new message being sent.

8. The method according to claim 1 wherein the first upper limit is 2n.

9. The method according to claim 1 further comprising:
    if the first round counter is not below the first upper limit, checking if the first round counter is below a second upper limit; and
    if the first round counter is not below the second upper limit:
        checking for any active counters associated with received processor values; and
        if no active counters associated with received processor values are found:
            checking a termination counter for the $P^{th}$ processor; and
            if the termination counter for the $P^{th}$ processor is dormant, activating the termination counter with an initial value if the termination counter for the $P^{th}$ processor is not dormant:
  checking if a timer for a current round of the termination counter has expired; and
  if the timer for the current round of the termination counter has not expired continuing operating the receiver to receive messages;
  If the timer for the current round of the termination counter has expired:
    checking if the termination counter for the $P^{th}$ processor has reached a third upper limit ; and
    if the termination counter for the $P^{th}$ processor has reached the third upper limit performing a function on processor values accepted by the $P^{th}$ processor.

10. The method according to claim 1 further comprising:
if the first round counter is not below the first upper limit, checking if the first round counter is below a second upper limit; and
if the first round counter is below the second limit and a number of processors in the routing path of the $m^{th}$ message is less than the value of the termination counter minus a predetermined number then:
  adding the $P_o^{th}$ processor value to the first list of processor values;
  creating the new message that includes the $P_o^{th}$ processor value;
  checking the timer for the current round of the first round counter; and
    if the timer for the current round has expired, then:
    sending the new message that includes $P_o^{th}$ processor value to at least the subset of the subset of processors within communication range of the $P^{th}$ processor.

11. The method according to claim 10 wherein:
the second upper limit is 3n.

12. The method according to claim 10 wherein:
the predetermined number is the current value of first round counter minus the first predetermined value minus 1.

13. The method according to claim 1 wherein:
if the first list of processor values includes the $P_o^{th}$ processor value:
discarding the $m^{th}$ message.

* * * * *